Aug. 6, 1940.  M. J. KITTRELL ET AL  2,210,296
MEANS FOR CONNECTING MINERS' EXTENSION DRILLS
Filed Sept. 23, 1939
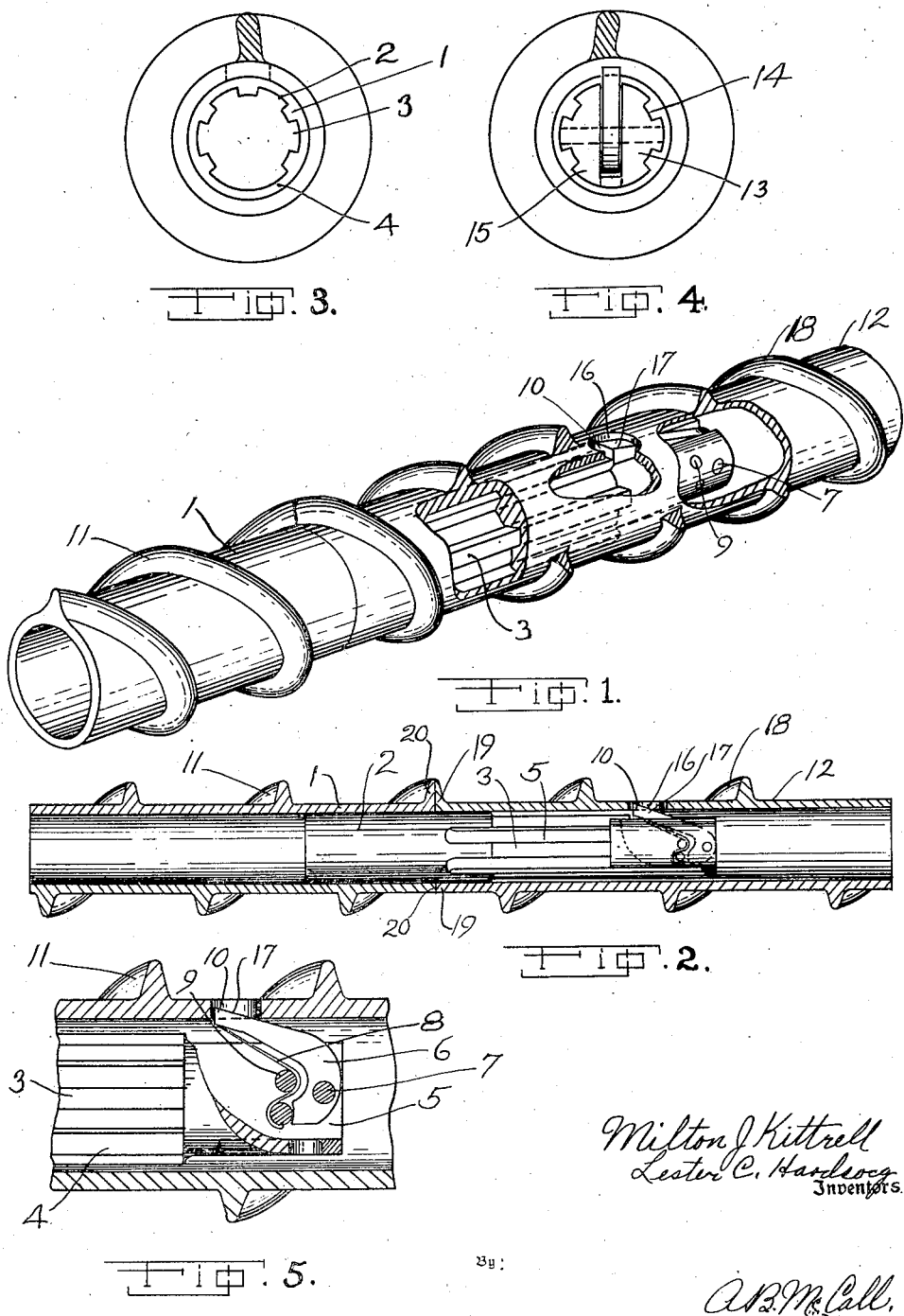

Patented Aug. 6, 1940

2,210,296

UNITED STATES PATENT OFFICE 2,210,296

MEANS FOR CONNECTING MINERS' EXTENSION DRILLS

Milton J. Kittrell and Lester C. Hardsocg, Ottumwa, Iowa, assignors to Hardsocg Manufacturing Company, Ottumwa, Iowa Application September 23, 1939, Serial No. 296,180

6 Claims. (Cl. 255—69)

Our invention relates to means for connecting tubes and rods together end to end, and has to do with means for detachably connecting the same; an object being in our device to provide an effective and practical as well as an economical means of telescopically interconnecting extension members of rods, tubes, drills and the like.

A further object of our invention is to provide means for detachably and telescopically adding rod, tube or drill lengths in case of need where it is desired to hold the connecting sections into fixed operative relation to each other.

A particular object of our invention is to furnish means for firmly, conveniently, and in a very practical way provide a detachable connection between drill sections of a miner's drill, where an extension in the drill length is desired, and a means for detachably holding such drill sections together so that they will fit the same way each time and will not rotatably slip out of line, since the conveying spirals need to be properly aligned spirally.

We attain the objects of our invention by the details of its construction described in the annexed specification, defined in the claims and shown in the drawing.

Referring to the drawing:

Fig. 1 is a perspective of our invention showing in a cut-away some details of its construction.

Fig. 2 is a longitudinal section of our invention disclosing interior details of its construction.

Fig. 3 is an end view of the shank end of our device.

Fig. 4 is an end view of the socket end of our device into which the shank end is adapted to fit.

Fig. 5 is a detail of the trigger construction adapted to hold the drill sections from slipping apart when they are detachably connected.

Referring now to the details of construction and operation of our device we provide effective and practical means for connecting together sections of a rod, a tube and the like and especially for connecting together extension sections of a miner's drill.

For instance in connection with the duties of a coal miner he has to drill relatively deep holes into the coal to prepare for blasting the coal and many times it is necessary to drill one hole deeper than another. When it is thus necessary to drill an unusually deep hole, then an extension may be needed in the length of the drill.

It is therefore very essential that when extensions are made in the drill length the added section must be made to detachably engage the drill shank in a manner that will hold it into a relatively fixed position where it will neither turn nor slip out of its operative position.

When the drill sections are thus detachably connected telescopically in a way that will hold the conveying spiral flanges of each in their contacting spiral alignment the reason for them fitting always the same will be obvious.

It will at once be evident in a study of this invention that the details of its construction will be effective for connecting tubes, rods, and other such devices, but in the illustrations we show the principle of its operation as used in connection with a miner's drill construction and extensions therefor, wherein a drill body 1 of a miner's drill has a terminal shank member 2 shaped to define a series of integral male splines 3 spaced about the same, but with one of such splines 4 larger or smaller than the others.

The terminal shank 2 has a longitudinal slot 5 which pivotally houses a resilient trigger 6 pivoted on a pin 7 fixed in a transverse position across slot 5 a strip spring 8 supported by a pin 9 tends to hold trigger 6 where it is outwardly urged at its free end 10, with its forward surface 17 slanting and its free end shaped to define a stop member.

This drill body 1 is spirally encompassed by a conveying spiral flange 11 integral therewith.

This drill body 1 is thus described as the main portion of the drill with its shank 2 having the male splines 3 and trigger 6 thereon but it is obvious that when an extension to the drill body is needed then the extension thus added could have this shank member if desired with the part receiving it provided in the main drill body. However, for the purpose of explaining the merits of our invention we shall describe the extension portion of the drill as that part of the apparatus provided with the socket for receiving shank member 2.

Thus in describing the extension portion 12 of the drill body it will be noted that it is provided with the terminal socket 13 having female splines 14 about its inner wall to correspond with the splines 3 on shank 2 of the drill body 1.

This socket with its group of splines 14 spaced in their longitudinal position are adapted to slidably accommodate splines 3 on shank 2 but among splines 14 there is a space 15 made either wider or more narrow than the other splines but made to correspond in width to spline 4 of shank 2 so that when the extension portion 12 of the drill body is telescopically slipped over shank member 2 then spline member 4 will slidably fit into the one odd sized space 15 of the socket 13 making it thus mechanically necessary for the extension portion 12 of the drill body to always fit the main portion of the drill body in exactly the same position.

This extension portion 12 of the drill is provided with a transverse aperture 16 registering with the socket 13 therein and is thus placed with an important function in the operative relationship of the two drill body members.

For instance it will be noted that trigger 6 pivoted in its resilient support in slot 5 of shank 2 on a pin 7 normally is held in position where its outward free end 10 snaps up into aperture 16 of drill body 12 where trigger 6 thus prevents shank 2 from inadvertently slipping out of socket 13.

It will be noted that the forward surface 17 of trigger 6 slopes toward the terminal shank 2 to permit this shank to be slidably inserted into socket 13 with the free end 10 of trigger 6 serving as a stop member against the walls of aperture 16 after the shank member 2 has been telescopically engaged by socket 13 in their operative fitting relation.

It will be observed that the extension portion 12 of the drill body is provided with a conveying spiral member 18 while the inner terminal 19 of extension member 12 is adapted to operatively abut against shoulder 20 of drill body 1 when the extension body 12 is connected with this drill body over shank 2.

When this connection is telescopically made the body member 1 and the extension portion 12 of the drill are thus brought into a predetermined fitting position each time they are connected.

With this arrangement the adjacent ends of conveying spiral flange members 11 and 18 each being flush with their respective adjacent terminals identified respectively by shoulder 20 and terminal 19, will thus be brought together abutting so that the two spiral conveying members, when operatively and detachably connected, will be firmly held into co-registering spiral alignment whenever the extension portion 12 of the drill body is thus detachably secured to the drill body 1.

Having thus described the nature of our invention what we claim is:

1. In a miner's drill construction, the combination comprising a drill rod made in sections, one of which sections is provided with a central drill socket, a plurality of spaced longitudinal splines about said inner wall of said socket and a transverse aperture extending through the side of said wall to communicate with said socket, the other of said drill rod sections shaped to define a terminal shank having a plurality of longitudinal parallel spaced splines and provided with a longitudinal slot and a resilient stop member trigger pivotally mounted within said slot, one of said splines having a predetermined shape and size unlike the others and said socket of the first section having a portion of its inner wall shaped to slidably and snugly accommodate only the one spline having an odd shape and size on the said terminal shank of said second drill rod section.

2. In a miner's drill construction, the combination comprising a drill rod made in sections, one of which sections is provided with a central drill socket, a plurality of spaced longitudinal splines about said inner wall of said socket and a transverse aperture extending through the side of said wall to communicate with said socket, the other of said drill rod sections shaped to define a terminal shank having a plurality of longitudinal, parallel spaced splines and provided with a longitudinal slot and a resilient stop member trigger pivotally mounted within said slot, one of said splines having a predetermined shape and size unlike the others and said socket of the first section having a portion of its inner wall shaped to slidably and snugly accommodate only the one spline having an odd shape and size on the said terminal shank of said second drill rod section; said splines of said socket and said terminal shank thus shaped to bring their inner-connecting position always the same; said trigger with its outwardly urging spring pivotally secured to said terminal shank in a position where said spring will force the free end of the trigger up into said transverse aperture through the socket wall of the first section; said drill rod sections each provided with spiral flanges which are brought into spiral alignment when the adjacent ends of said drill rod sections are thus telescopically interconnected in their operative position.

3. As a new article of manufacture a detachable connection for extension rods comprising one rod section shaped to define a terminal having a plurality of spaced parallel, longitudinal male splines and provided adjacent the end thereof with a longitudinal slot and a spring actuated trigger pivotally supported therein; said trigger having a general slope on its forward surface and an abrupt terminal at its free end and a pivoted spring urging an outward pressure against said free end, one of said male splines unlike the others in size, and another rod section shaped to define a longitudinal central terminal socket provided with a plurality of spaced parallel longitudinal female splines about the inner wall thereof, one of said female splines unlike the others in size and shaped to slidably accommodate the odd size male spline of the first section of the extension rod and to define a transverse aperture through the wall of said socket; said sections each provided with an integral conveying spiral, the adjacent terminals of which are each brought into co-registering spiral alignment when said sections are telescopically interconnected in their operative position wherein their relative fitting relationship is always the same.

4. As a new article of manufacture, a detachable connection for extension rods comprising one rod section shaped to define a terminal having a plurality of spaced parallel, longitudinal male splines and provided adjacent the end thereof with a longitudinal slot and a trigger having a general slope on its forward surface and pivotally supported therein, an abrupt terminal at the free end of said trigger and a pivoted spring urging an outward pressure against said free end, one of said male splines unlike the others in size, and another rod section shaped to define a longitudinal central terminal socket provided with a plurality of spaced parallel longitudinal female splines about the inner wall thereof, one of said female splines unlike the others in size and shaped to slidably accommodate the odd size male spline of the first section of the extension rod and to define a transverse aperture through the wall of said socket; said sections each provided with an integral conveying spiral the adjacent terminals of which are each brought into co-registering spiral alignment when said sections are telescopically inter-connected, including the corresponding odd sized splines; then said rod sections will not relatively rotate and will always register in the same fitting relationship to bring said integral conveying spiral members into co-registering spiral alignment when their adjacent ends meet.

5. As a new article of manufacture, a means for detachably connecting tubular and rod extension members, comprising an elongated member shaped at a free end to define a terminal shank having a plurality of lengthwise flanking splines with a predetermined number of said splines unlike the others in size, a resilient trigger pivoted in a slot provided in said terminal shank; a second elongated member shaped to define an extension for the first and to define a terminal socket provided with inner splines spaced and shaped to slidably accommodate said splines of the terminal shank on the first member; said inner splines of a size respectively and arranged in a spaced relation to each respectively slidably receive a corresponding spline of the first elongated member, said socket provided with a transverse aperture shaped to define stop means for holding said trigger of said first member to prevent unwarranted removal of its terminal shank from said socket.

6. As an improvement in drills, the combination comprising a drill body shaped at a free end to define an integral terminal shank having a plurality of longitudinal side splines with a predetermined number of said splines unlike the others in size, a longitudinal slot in said shank and a spring mounted pivoted trigger operatively housed in said slot, an extension drill body shaped and adapted to detachably operate, to add to the length of the first drill body and shaped to define a terminal socket operatively receiving said shank of the first drill body member, a plurality of inner splines in said socket and each respectively formed in size and shape to slidably receive a corresponding spline of said shank member, a transverse hole provided in said socket to provide stop means for said trigger, a conveying spiral member integral with said drill body and also on said extension drill body; said spiral members each contacting at their adjacent abutting ends where they meet each time in a co-registering spiral alignment when said extension member is operatively and detachably secured to the first drill body member.

MILTON J. KITTRELL.
LESTER C. HARDSOCG.